United States Patent [19]

Reits

[11] Patent Number: 4,616,232
[45] Date of Patent: Oct. 7, 1986

[54] SIDE-LOBE BLANKING CIRCUIT

[75] Inventor: Bernard J. Reits, Hengelo, Netherlands

[73] Assignee: Hollandse Signaalapparaten B.V., Hengelo, Netherlands

[21] Appl. No.: 755,384

[22] Filed: Jul. 16, 1985

[30] Foreign Application Priority Data

Aug. 21, 1984 [NL] Netherlands .......................... 8402559

[51] Int. Cl.⁴ ............................ G01S 3/16; G01S 3/28
[52] U.S. Cl. .................................... 342/379; 342/189; 342/201
[58] Field of Search ............... 343/379, 7 A; 455/278, 455/296

[56] References Cited

U.S. PATENT DOCUMENTS 4,381,508  4/1983  Durboraw, III ..................... 343/379

Primary Examiner—Theodore M. Blum
Attorney, Agent, or Firm—Robert J. Kraus

[57] ABSTRACT

A pulse radar apparatus is provided with a first receiver (4) connected to a directional antenna (3) and a second receiver (13) connected to an omnidirectional antenna (12). The receivers (4, 13) are suitable for reception and processing of long-duration and short-duration radar signals respectively, whereby at least the long-duration signals are frequency-modulated and subjected to pulse compression. The radar apparatus is further provided with a side-lobe blanking circuit (20) and switching means (25, 26). The side-lobe blanking circuit (20) comprises: comparator means (21, 22, 23) for supplying, in response to the long- and short-duration signals of the receivers (4, 13), a first control signal (PCSWP) indicative of the maximum amplitude of the long-duration signals, a second control signal ($\overline{PCSWP}$) indicative of the maximum amplitude of the short-duration signals, and a third control signal ($PC/\overline{PC}$) to indicate whether the amplitude of the short-duration signals of the first receiver (4) exceeds a given value. A logic circuit (24) supplies a switching signal (SWP1) to block the signals from the first receiver (4). The switching signal is dependent on the first (PCSWP) and second ($\overline{PCSWP}$) control signals if the third ($PC/\overline{PC}$) control signal indicates that the amplitude of the short-duration signals exceeds the given value.

2 Claims, 1 Drawing Figure

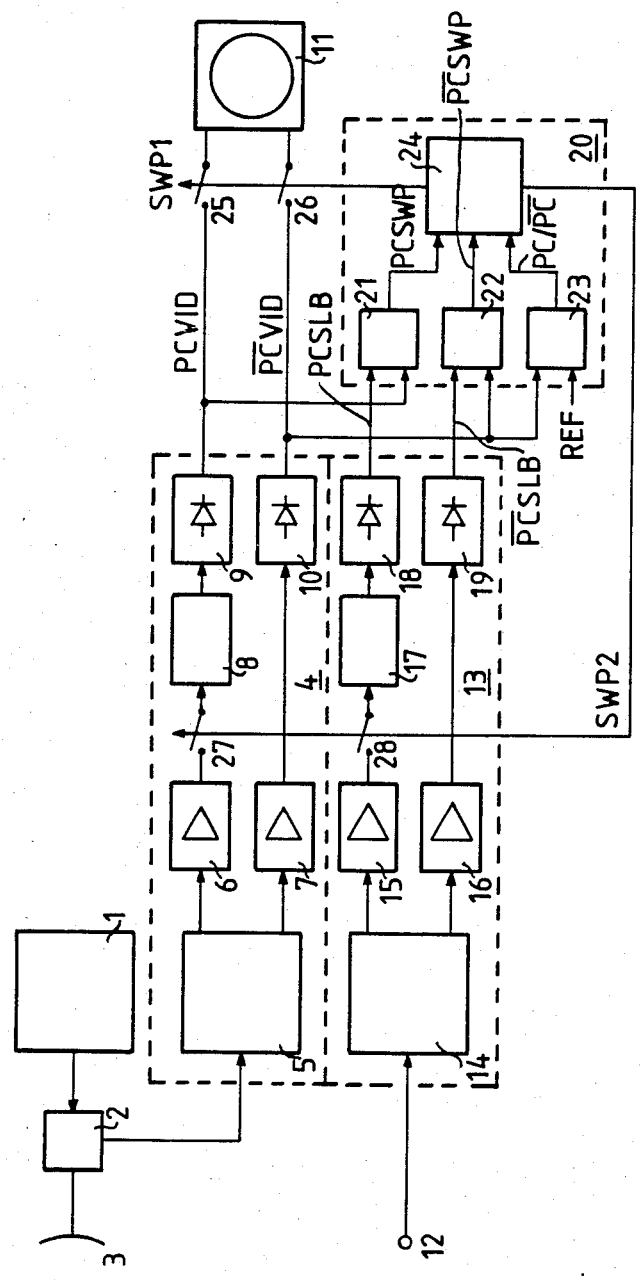

SIDE-LOBE BLANKING CIRCUIT

BACKGROUND OF THE INVENTION

The invention relates to a side-lobe blanking circuit for a pulse radar apparatus, provided with a transmitting and receiving unit containing a transmitter, a directional transmitting and receiving antenna, a first receiver containing a pulse compression filter and an omnidirectional receiving antenna, and a second receiver containing a pulse compression filter. The transmitting and receiving unit is suitable for the transmission, reception and processing of relatively long-duration and relatively short-duration radar pulses into video signals in the two receivers. At least the relatively long-duration pulses are frequency-modulated. The radar apparatus is further provided with first switching means, whereby in response to the video signals from the two receivers the side-lobe blanking circuit supplies a first switching signal to block, when applied to the switching means, the transport of the video signals from the first receiver to the switching means.

The beam pattern of a directional transmitting and receiving antenna contains, in addition to its main lobe, several side lobes, which are usually 30 to 40 dB weaker than the main lobe. However, even in the case of an ideal beam pattern, apparent side lobes could arise because of obstacles in the vicinity of the antenna. For instance, in a ship radar system, strong targets, such as islands, offshore oil rigs, supertankers, etc. may give rise to radar echoes in the order of 80 to 120 dB above noise level. These echoes prevail not only in the main lobe, but also in the side lobes of the antenna beam pattern, give rise to annular echoes when presented on a PPI display, and require more complicated video processing and extraction. For this reason means have been developed to distinguish echoes received through side lobes from echoes received through the main lobe. These means include an omnidirectional antenna; this is an antenna that is sensitive in all directions and in elevation especially for the horizon, from which strong echoes can be expected. The omnidirectional antenna is required to possess a gain, which is greater than the gain of the directional antenna in the side lobes of the beam pattern thereof. Side-lobe blanking is based on the principle that, as soon as the echo strength through the receiver connected to the omnidirectional antenna is greater than that through the receiver connected to the directional antenna, the echo is evidently not from a target contained in the main lobe of the beam pattern and further transport of the video signal from this echo in the receiver connected to the directional antenna is interrupted. This principle has been known for a long time.

In a pulse radar apparatus, where frequency-modulated transmitter signals are emitted and where in the receiver of this apparatus the received and processed echoes are compressed accordingly through a suitable filter, side-lobe blanking can equally be applied. In such a case, the receiver connected to the omnidirectional antenna will also be provided with a pulse compression filter. Pulse compression improves the signal/noise ratio by about 20 dB; this means that certain annular echoes received through the side lobes and detected without compression might not be displayed on a PPI, but might be so displayed if they are compressed before detection. It is therefore possible to apply side-lobe blanking according to the aforementioned principle, viz. by a side-lobe blanking circuit that, in response to both the echoes compressed and detected in the receiver connected to the directional antenna and the echoes compressed and detected in the receiver connected to the omnidirectional antenna, interrupts any further transport of the echoes compressed and detected in the receiver connected to the directional antenna. However, the side-lobe blanking circuit does not operate satisfactorily because of the non-ideal operation of the pulse compression filters. Such a filter not only compresses the pulse, for instance a 50 $\mu$s pulse to an approximately 0.5 $\mu$s pulse, but also produces several time side lobes at a level of, say, $-40$ dB. For this reason the dynamics of the receivers' part preceding the pulse compression filter is limited, in the cited example to about 40 dB. This means that strong target echoes and hence annular echoes received through the side lobes may drive the receivers to saturation. In such a case it is not possible to make a choice between the received, compressed and detected echoes in the two receivers. Therefore, it cannot be determined whether the transport of the video signals from the first receiver has to be stopped; that is, it is not possible to distinguish between echoes received through the main lobe and the side lobes. This problem cannot be solved by feeding the non-compressed echoes to the side-lobe blanking circuit. The above argument that it is possible to display on a PPI the annular echoes received through the side lobes and compressed before detection may not be so for non-compressed and detected echoes. It should be noted, however, that the non-compressed pulse may be of a relatively long duration, for example 50 $\mu$s, thus covering a large distance, so that blanking during this period affects the operation of the pulse radar apparatus.

SUMMARY OF THE INVENTION

It is an object of the invention to provide a side-lobe blanking circuit, which overcomes the above disadvantages to a high degree. According to the invention, the side-lobe blanking circuit for a pulse radar apparatus as cited in the opening paragraph comprises: first comparator means for receiving the video signals of the relatively long-duration pulses compressed and processed in the two receivers, and supplying a first control signal indicative of the maximum amplitude of the two kinds of video signals; second comparator means for receiving the video signals of the relatively short-duration pulses processed in the two receivers and supplying a second control signal indicative of the maximum amplitude of the two kinds of video signals; third comparator means for supplying, in response to the video signals of the relatively short-duration pulses processed in the first receiver, a third control signal to indicate whether the amplitude of said latter video signals exceeds a given value; and a logic circuit for supplying the first switching signal, being dependent on the first control signal only if the third control signal indicates that the amplitude of the relatively short-duration pulses processed in the first receiver does not exceed the given value, and being dependent on the second control signal only if the third control signal indicates that the amplitude of the relatively short-duration pulses processed in the first receiver exceeds the given value. The side-lobe blanking circuit therefore does not respond only to the compressed and detected echoes obtained in the two receivers, but also to echoes from the signals of relatively short duration; in case the compressed and detected echoes in the two receivers have been blocked, the side-lobe blanking circuit in particular responds only to the video signals obtained in the two receivers and derived from echoes of the signals of relatively short duration. The side-lobe blanking circuit according to the invention can be applied to advantage particularly in the conventional pulse radar apparatus, using pulses of relatively short duration to cover close ranges, in addition to the frequency-modulated pulses of relatively long duration to cover large ranges.

BRIEF DESCRIPTION OF THE DRAWING

The invention and its advantages will now be described with reference to the accompanying FIGURE, illustrating a block diagram of a pulse radar apparatus containing the side-lobe blanking circuit according to the invention.

DESCRIPTION OF THE PREFERRED EMBODIMENT

The pulse radar apparatus depicted in the FIGURE is provided with a transmitting and receiving unit containing a transmitter 1, a duplexer 2, a directional transmitting and receiving antenna, for example, a reflector antenna 3, and a first receiver 4. Transmitter 1 is designed to generate radar pulses of both relatively long and relatively short duration, where at least the pulses of relatively long duration are frequency modulated. These radar pulses are transmitted via duplexer 2 and antenna 3. Antenna 3 and duplexer 2 feed echoes from the two kinds of pulses to receiver 4, where they are processed into corresponding video signals. Receiver 4 comprises a receiver part 5 for amplifying the receiver-supplied pulses, converting these pulses down to intermediate frequency, and distributing them over to IF amplifiers 6 and 7. Amplifier 6 is fed with the frequency-modulated pulses of relatively long duration, which pulses are subsequently compressed in filter 8 and detected in detector 9. Amplifier 6, filter 8 and detector 9 form part of the first receiver 4. Amplifier 7 receives the pulses of relatively short duration; after amplification, these pulses are detected in detector 10. Also amplifier 7 and detector 10 form part of the first receiver 4. The video signals supplied by detectors 9 and 10 can be displayed on a PPI 11. The transmitting and receiving unit further comprises an omnidirectional antenna 12 and a second receiver 13. Receiver 13 is of the same design as the first receiver 4, and comprises a receiving part 14, IF amplifiers 15 and 16, a pulse compression filter 17 and detectors 18 and 19. The operation of the second receiver 13 is identical to that of the first receiver 4. The echoes of the pulses of relatively long duration and those of relatively short duration, as received from the omnidirectional antenna are therefore processed into video signals to be supplied by detectors 18 and 19, respectively. The pulse radar apparatus also comprises a side-lobe blanking circuit 20. This circuit consists of first, second and third comparator means 21, 22 and 23, respectively, and a logic circuit 24. First comparator means 21 receives the video signals of the relatively long-duration pulses, compressed and processed in receivers 4 and 13, and in particular the video signals PCVID and PCSLB, respectively, supplied by detectors 9 and 18. First comparator means 21 supplies a first control signal PCSWP indicative of the maximum amplitude of the two kinds of video signals. If the amplitude of video signal PCVID is greater than that of video signal PCSLB, then PCSWP=1, but if this is not so, PCSWP=0. Second comparator means 21 receives the video signals from the pulses of relatively short duration processed in receivers 4 and 13, and in particular the $\overline{PC}VID$ and $\overline{PC}SLB$ video signals supplied by detectors 10 and 19. Second comparator means 22 supplies a second control signal $\overline{PCSWP}$, indicative of the maximum amplitude of these two video signals. If the amplitude of the $\overline{PC}VID$ video signal is greater than that of the $\overline{PC}SLB$ video signal, $\overline{PCSWP}=1$, but if this is not so $\overline{PCSWP}=0$. Third comparator means 23 responds to the video signals from the pulses of relatively short duration processed in the first receiver, and in particular to the $\overline{PC}VID$ video signals, and supplies a third control signal $PC/\overline{PC}$ to indicate whether these signals contain an amplitude that exceeds a certain REF value. If the amplitude of $\overline{PC}VID$ is greater than REF, $PC/\overline{PC}=1$, but if is not so $PC/\overline{PC}=0$. The PCSWP, $\overline{PCSWP}$ and $PC/\overline{PC}$ signals are supplied to logic circuit 25 which, in response, produces a first switching signal SWP1 to operate first switching means 25 and 26. First switching means 25 and 26 are connected behind detectors 9 and 10 and are able to interrupt the video signals supplied by these detectors in case the side-lobe blanking circuit establishes that the video signals were from the signals received via the side lobes.

If $PC/\overline{PC}=1$, the $\overline{PC}VID$ video signal is of a sufficiently large amplitude and the echoes from pulses of relatively short duration, received via the main lobe of the antenna beam pattern, in order that the first switching signal SWP1 be determined by second comparator means 22. In this situation, first comparator means 21 is assumed to be unreliable, as it is probable that the PCVID and PCSLB video signals will be more or less of the same amplitude due to the receiver driven to saturation through echoes from strong target signals in the main and side lobes. If $PC/\overline{PC}=0$, the $\overline{PC}VID$ video signal is of a too small an amplitude, and first comparator means will be sufficiently reliable to determine the first switching signal SWP1.

The side-lobe blanking circuit here described may be used successfully against pulse jamming sources, whose signals are received via the side lobes. To this effect, however, second switching means 27 and 28 have to be included before pulse compression filter 8 and 17. Second switching means 27 and 28 are controlled by a switching signal SWP2 supplied by the side-lobe blanking circuit. Since jamming pulses have no frequency modulation matched to the pulse compression filters, these pulses are stretched in time and attenuated by these filters. Were these pulses to remain visible on the PPI without taking any measures of side-lobe blanking, it is not recommended to use side-lobe blanking through switching means 25 and 26, as these would interrupt further transport of the video signals for too long a period. In case of severe jamming, $PC/\overline{PC}=1$ and second comparator means 22 would be able to determine the second switching signal SWP2. Besides pulse jammers, CW and noise jammers may be incurred. The effect of these jammers can be countered by the conventional side-lobe suppression circuits. Both the blanking and the suppression circuits are able to respond to the signals supplied by receivers 4 and 13.

It is possible to apply frequency modulation to the transmitter pulses of relatively short duration. In such a case, corresponding pulse compression filters must be incorporated between amplifiers 7 and 16 on the one hand and detectors 10 and 19 on the other hand.

Through the large difference in energy contents between the two kinds of transmitter pulses, the operation of the side-lobe blanking circuit remains unchanged. Also in this case, it is desirable to insert switching means to be connected between amplifiers 7 and 16 on the one hand the the then-introduced pulse compression filters on the other hand and to be operated by second switching signal SWP2.

I claim:

1. A side-lobe blanking circuit for a pulse radar apparatus, provided with a transmitting and receiving unit containing a transmitter, a directional transmitting and receiving antenna, a first receiver containing a pulse compression filter and an omnidirectional receiving antenna, and a second receiver containing a pulse compression filter, said transmitting and receiving unit being suitable for the transmission, reception and processing of relatively long-duration and relatively short-duration radar pulses into video signals in the two receivers, whereby at least the relatively long-duration pulses are frequency-modulated, said radar apparatus being further provided with first switching means, whereby in response to the video signals from the two receivers the side-lobe blanking circuit supplies a first switching signal to block, when applied to said switching means, the transport of the video signals from the first receiver to the switching means, characterised in that the side-lobe blanking circuit comprises:

(a) first comparator means for receiving the video signals of the relatively long-duration pulses compressed and processed in the two receivers, and for supplying a first control signal indicative of the maximum amplitude of the two kinds of video signals;

(b) second comparator means for receiving the video signals of the relatively short-duration pulses processed in the two receivers and for supplying a second control signal indicative of the maximum amplitude of the two kinds of video signals;

(c) third comparator means for supplying, in response to the video signals of the relatively short-duration pulses processed in the first receiver, a third control signal to indicate whether the amplitude of said latter video signals exceeds a given value; and (d) a logic circuit for supplying the first switching signal, being dependent on the first control signal only if the third control signal indicates that the amplitude of the relatively short-duration pulses processed in the first receiver does not exceed said given value, and being dependent on the second control signal only if the third control signal indicates that the amplitude of the relatively short-duration pulses processed in the first receiver exceeds said given value.

2. A side-lobe blanking circuit for a pulse radar apparatus as claimed in claim 1, characterised in that the logic circuit delivers a second switching signal to prevent the signals processed in the receivers from being supplied to the pulse compression filters via second switching means included in the two receivers, in case the third control signal indicates that the amplitude of the relatively short-duration pulses processed in the first receiver exceeds said value.

* * * * *